(12) United States Patent
Pescianschi

(10) Patent No.: US 12,518,686 B2
(45) Date of Patent: Jan. 6, 2026

(54) LED DISPLAY WITH RESISTIVE MEMORY

(71) Applicant: Dmitri Pescianschi, Quedlinburg (DE)

(72) Inventor: Dmitri Pescianschi, Quedlinburg (DE)

(73) Assignee: LMPU Holding Corp., Old Westbury, NY (US)

( * ) Notice: Subject to any disclaimer, the term of this patent is extended or adjusted under 35 U.S.C. 154(b) by 0 days.

(21) Appl. No.: 18/818,169

(22) Filed: Aug. 28, 2024

(65) Prior Publication Data

US 2025/0078736 A1 Mar. 6, 2025

Related U.S. Application Data

(60) Provisional application No. 63/534,895, filed on Aug. 28, 2023.

(51) Int. Cl.
*G09G 3/32* (2016.01)
*H10B 63/00* (2023.01)
*H10N 70/20* (2023.01)

(52) U.S. Cl.
CPC ............... *G09G 3/32* (2013.01); *H10B 63/20* (2023.02); *H10N 70/231* (2023.02); *G09G 2300/0842* (2013.01)

(58) Field of Classification Search
CPC ............ G09G 3/32; G09G 2300/0842; H10N 70/231; H10B 63/20
See application file for complete search history.

(56) References Cited

U.S. PATENT DOCUMENTS

| | | | | |
|---|---|---|---|---|
| 2011/0285309 A1* | 11/2011 | Van De Ven | .......... | H05B 45/28 315/291 |
| 2020/0312244 A1* | 10/2020 | Yang | .................... | G09G 3/3275 |
| 2024/0161683 A1* | 5/2024 | Kim | ......................... | G09G 3/32 |

* cited by examiner

*Primary Examiner* — Muhammad N Edun
(74) *Attorney, Agent, or Firm* — Anna Vishev

(57) ABSTRACT

Active matrix of LEDs (AM LED), which uses controlled resistors with memory as memory cells for pixels instead of capacitors. The LED cell voltage is controlled by a voltage divider on the controlled resistors.

1 Claim, 6 Drawing Sheets

LED DISPLAY WITH RESISTIVE MEMORY

CROSS-REFERENCE TO RELATED APPLICATIONS

This application claims all rights of priority to U.S. Provisional Patent Application No. 63/534,895, filed on Aug. 28, 2023.

FIELD OF INVENTION

The invention relates to the field of electronics, microelectronics, optoelectronics, information processing and conversion.

BACKGROUND OF THE INVENTION

To improve the visualization quality of LED displays, passive LED matrix is replaced by an active matrix of light-emitting diodes (AM LED). For example, AMOLED. A typical schematic of an individual AM LED pixel is shown in FIG. 1. It shows a typical circuit diagram of an AM LED cell.

The most common type of an Active Matrix LED is shown in FIG. 2. Selecting the active row of LED cells (Ri) opens the capacitors to write the voltages (Dj) encoding the brightness of the LEDs. Selecting the next row and turning off the current row does not disable the cells, as the required voltage level is stored in the capacitors. This scheme of the active matrix leads to a significant increase in image quality compared to a passive LED matrix. However, the Active Matrix LED has its own disadvantages. For example, the capacitors are subject to a fairly rapid leakage of charge. This requires constant regeneration, which is extremely difficult when storing analog information.

SUMMARY

In its general aspect, the invention is an active matrix of LEDs (AM LED), which uses controlled resistors with memory as memory cells for pixels instead of capacitors. The LED cell voltage is controlled by a voltage divider on the controlled resistors.

BRIEF DESCRIPTION OF THE DRAWINGS

The invention is illustrated by way of examples which are not a limitation, and the figures of the accompanying drawings in which references denote corresponding parts, and in which.

DESCRIPTION OF THE INVENTION

Figure 1:
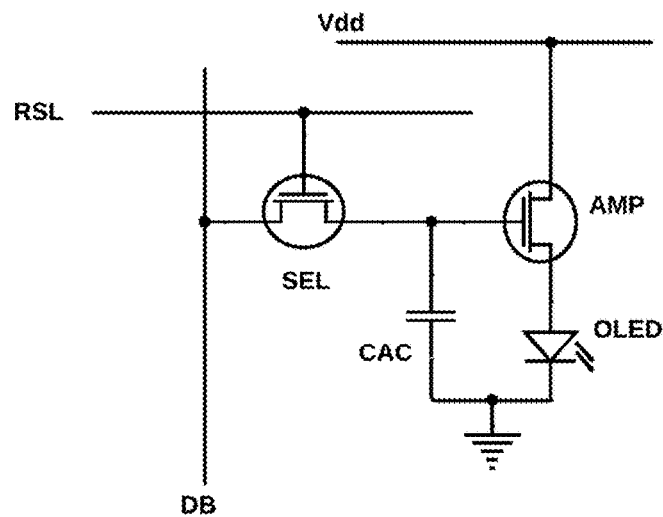
FIG. 1 shows a typical circuit diagram of an AM LED cell in accordance with prior art.
Figure 2:
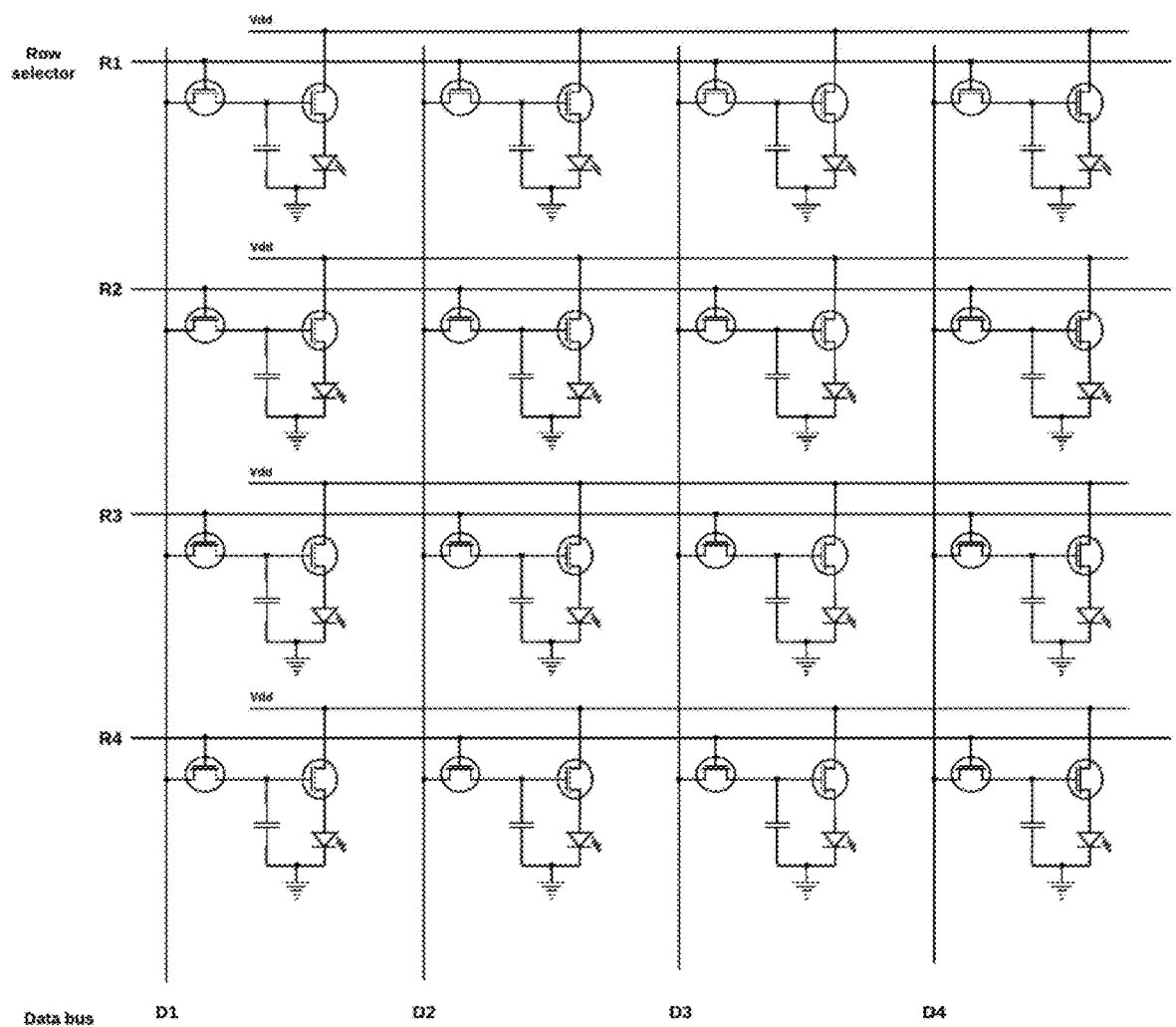
FIG. 2 shows a schematic of an Active Matrix LED in accordance with prior art.
Figure 3:
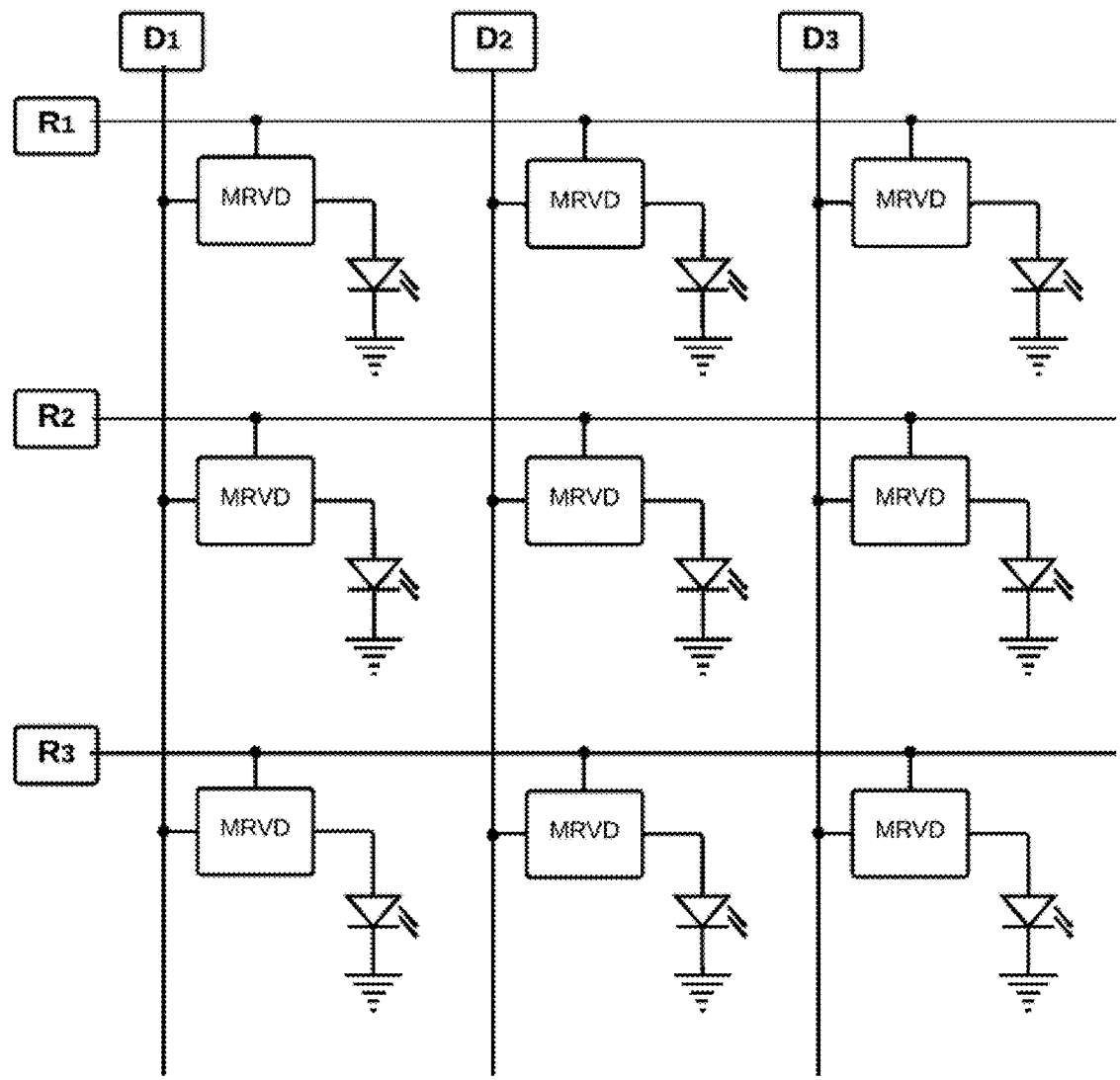
FIG. 3 shows a schematic of an Active Matrix LED in accordance with the preferred embodiment of the present invention.

As shown in FIG. 3, in the preferred embodiment of the invention, unreliable capacitors are replaced with reliable voltage dividers built on controllable memory resistors for controlling LEDs. An LED display is based on an active matrix, where each LED of any type, such as OLED, QLED, etc., is controlled by a voltage supplied from a Resistive Voltage Divider with Memory (MRVD), whose memory stores the value of the divider resistances that determines the voltage controlling the light-emitting diode (LED) cell. In FIG. 3, Ri is the address channel; Dj is the data channel; and MRVD is the resistive voltage divider with memory.

Figure 4:
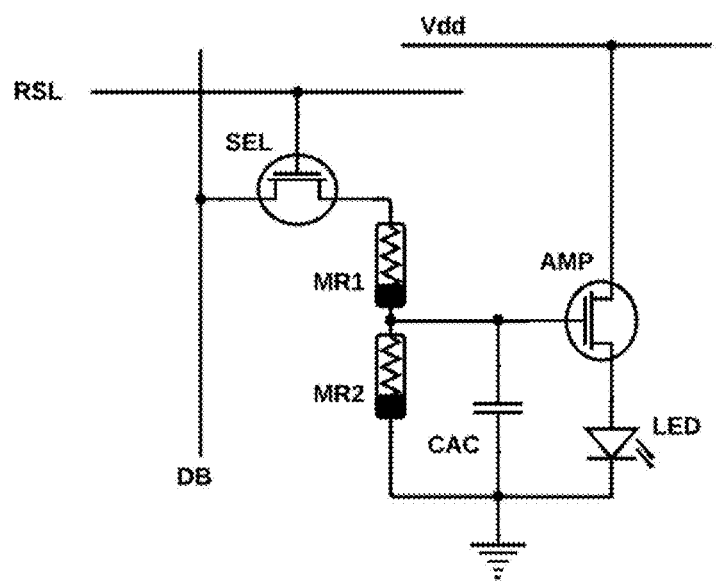
FIG. 4 shows a circuit diagram of a Memristor-based Memory LED cell.

In accordance with the preferred embodiment, the above-described Active Matrix LED utilizes memristors as controllable memory resistors. A circuit diagram of an LED cell with a memristor memory is shown in FIG. 4.

Figure 5:
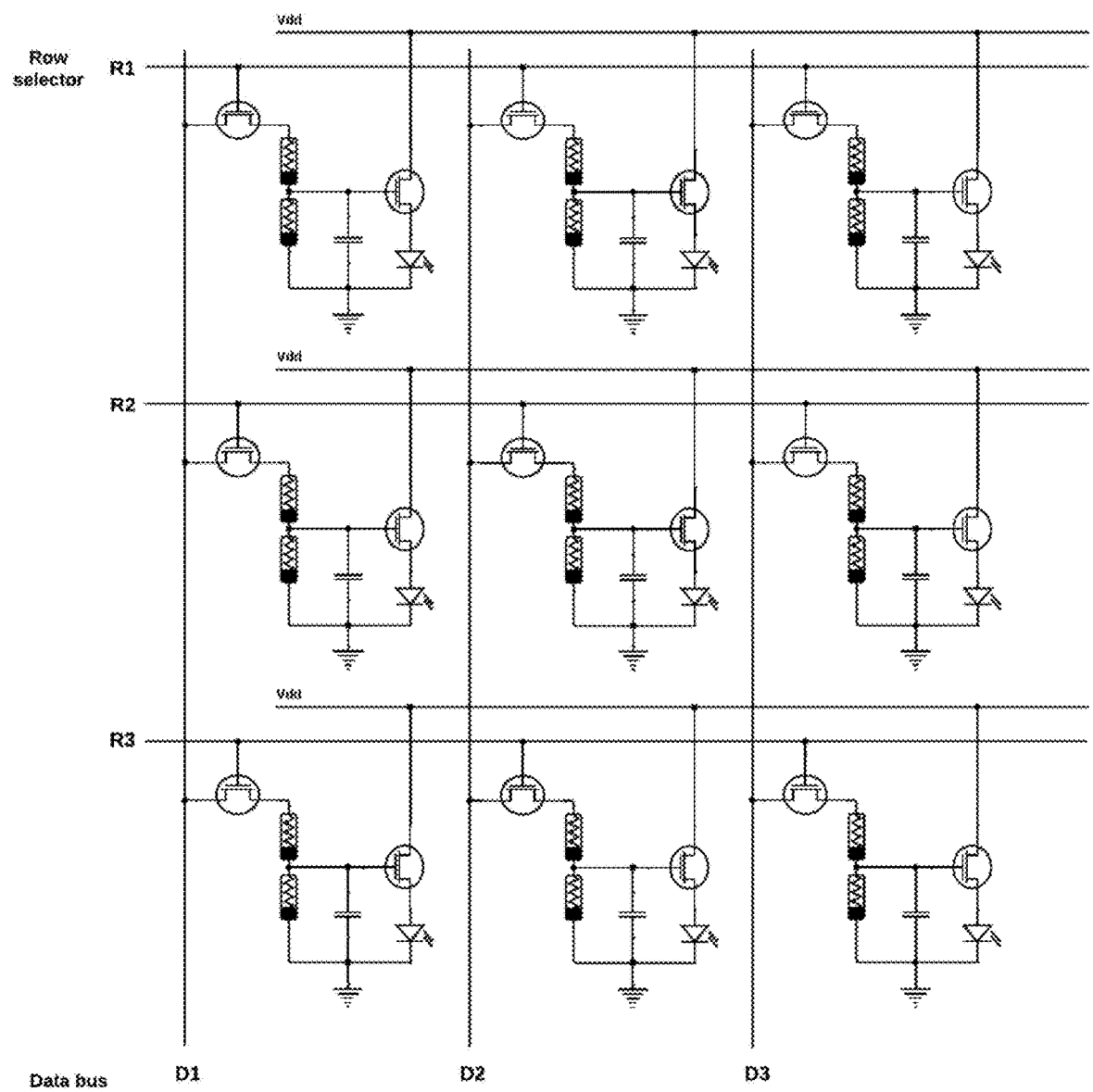
FIG. 5 shows a circuit diagram of a Memristor-based Memory LED Display.

In this case, one possible example of a display circuit, as shown in FIG. 5, would be the following, where the operation of the memristors is possible in two modes, i.e., write and read, and where in the write mode, the address channel (Ri) selects the line to be written and the data channel (Dj) supplies a voltage correcting the resistances of the memristors, while in the read mode, all address channels (Ri) can be opened simultaneously and the same signal can be supplied to all data channels (Dj), which will be transformed in each cell individually, according to the personal values of the resistances of the memristors of the voltage divider, resulting in the formation of an image.

In another preferred embodiment, instead of utilizing memristors, elements using a magnetoresistive effect can be used. In this alternative LED display, the memory is stored in the form of magnetic domains controlling the resistance of the elements as controllable memory resistors.

Figure 6:
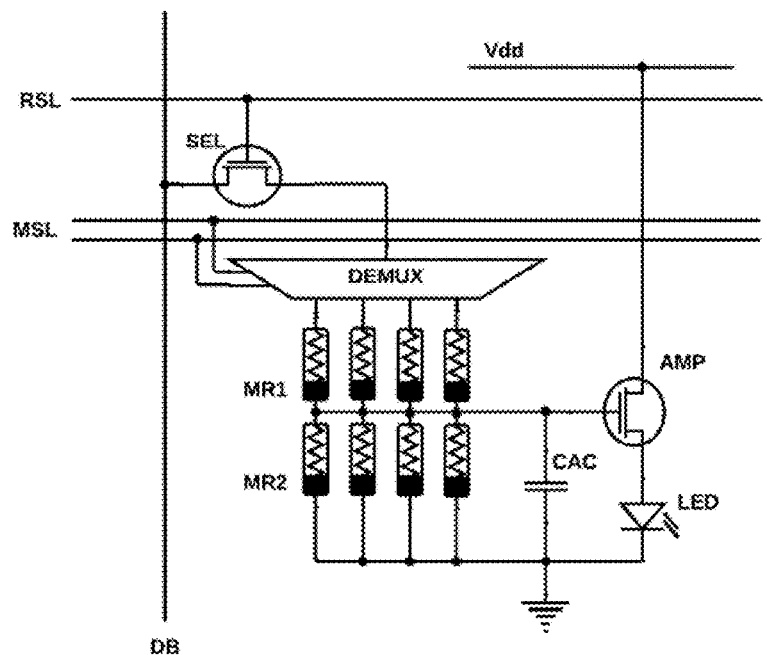
FIG. 6 shows a Circuit diagram of a Multiple Memristor Memory LED cell.

In another embodiment, the active matrix LED display of the present invention utilizes a bundle of index-addressable controllable resistors as a memory, which allows not just one image but many images to be stored in the memory and allows for switching between images by simply selecting the index of resistors from the bundle, as for example in one of the possible memristor-based circuits demonstrated in FIG. 6.

In the preceding specification, the invention has been described with reference to specific exemplary embodiments thereof. It will however, be evident that various modifications and changes may be made thereto without departing from the broader spirit and scope of the invention as set forth in the claims that follow. The specification and drawings are accordingly to be regarded in an illustrative manner rather than a restrictive sense.

The invention claimed is:

1. An LED display based on an active matrix, comprising:
a plurality of light-emitting diode (LED) cells, each cell comprising a resistive voltage divider having a memory element;
at least one address channel connected to said LED cells; and
at least one data channel connected to said LED cells,
wherein said light emitting diode cell is controlled by a voltage supplied from the resistive voltage divider, and wherein the memory element of the resistive voltage divider stores a value of the divider resistances that determines the voltage controlling the light-emitting diode cell;
wherein said resistive voltage divider is a memristor; and wherein said memristor is configured to operate in a write mode and a read modes, wherein when said memristor is in the write mode, the address channel selects a line to be written and the data channel supplies a voltage correcting the resistances of the memristors, wherein when said memristor is in the read mode, all address channels are configured to be opened simultaneously and the same signal can be supplied to all data channels, and wherein each supplied signal is then transformed in each cell individually, according to a personal values of the resistances of the memristors of the voltage divider.

\* \* \* \* \*